United States Patent [19]
Saito

[11] Patent Number: 5,463,419
[45] Date of Patent: Oct. 31, 1995

[54] IMAGE SIGNAL PROCESSING DEVICE FOR THINNING IMAGES

[75] Inventor: Osamu Saito, Asaka, Japan

[73] Assignee: Fuji Photo Film Co., Ltd., Kanagawa, Japan

[21] Appl. No.: 254,770

[22] Filed: Jun. 6, 1994

[30] Foreign Application Priority Data

Jun. 11, 1993 [JP] Japan .................................. 5-140300

[51] Int. Cl.[6] .................................................. H04N 5/907
[52] U.S. Cl. ........................... 348/233; 348/718; 382/232
[58] Field of Search ..................................... 348/222, 715, 348/716, 718, 719, 439, 458, 231, 233; 382/56; 345/185, 202, 203; 358/909.1, 444, 451; 360/9.1, 10.1, 11.1, 35.1; H04N 5/907

[56] References Cited

U.S. PATENT DOCUMENTS

| | | | |
|---|---|---|---|
| 4,829,453 | 5/1989 | Katsuta et al. ........................ | 382/56 |
| 5,027,214 | 6/1991 | Fujimori ............................... | 348/233 |
| 5,043,811 | 8/1991 | Yasuhiro .............................. | 348/458 |
| 5,343,256 | 8/1994 | Kimura et al. ....................... | 348/718 |

Primary Examiner—James J. Groody
Assistant Examiner—Jeffrey S. Murrell
Attorney, Agent, or Firm—Birch, Stewart, Kolasch & Birch

[57] ABSTRACT

In an image processing device, an analog-to-digital converter (ADC) transforms an image generated by an imaging device and having a high pixel density to a corresponding digital image signal. A YC processor processes the digital image signal to output an image signal in the form of a luminance signal and chrominance signals. A memory controller includes an address generator capable of generating a particular address signal for thinning, or reducing, the image signal. The address signal is fed to a frame memory. When the image signal is written to or read out of the frame memory, an image represented by the image signal is thinned by the address signal. The thinned image data are coded by a compander and then written to a memory card or reproduced by a playback circuit. The reproduced image signal appears on a video monitor or similar display.

14 Claims, 4 Drawing Sheets

528

IMAGE SIGNAL PROCESSING DEVICE FOR THINNING IMAGES

BACKGROUND OF THE INVENTION

1. Field of the Invention

The present invention relates to an image signal processing device and, more particularly, to an image signal processing device capable of selectively recording image signals in a memory card or similar data recording medium or reproducing them read out of the medium.

2. Description of the Related Art

A still camera has traditionally referred to an apparatus of the kind recording pictures in a medium implemented as a film which carries a layer of silver halide sensitive material on the surface thereof. A recent achievement in the imaging art is an electronic still camera operable with a recording medium in the form of a memory card which is loaded with a semiconductor memory. On shooting a desired object, this type camera records the resulting image signal in the memory card, which is removably mounted to the camera, in a digital signal format. The electronic still camera is advantageous over the traditional still camera in various aspects. For example, the camera has a small size and light weight and is capable of storing image data in a memory card and reproducing them instantly. In addition, the camera extends the applicable range of digitized image data. Moreover, regarding quality, pictures produced by this type of camera are now comparable with pictures produced by silver halide sensitive type of photography.

In a specific form of electronic still camera, an optical image representative of a scene is incident to an imaging device via a lens and converted to an electric image signal thereby. A preprocessing circuit executes various kinds of signal processing, including white balance adjustment and tone correction, with the image signal. An analog-to-digital converter digitizes the processed image signal to produce a corresponding digital image signal, i.e., image data. The image data is written to a frame memory. At the same time, the image data are transformed to image data represented by a luminance signal and by chrominance signals. The image data stored in the frame memory are read out in a plurality of blocks, compressed, or coded, by a compander (compressor/expander), and then written to a memory card which is removably mounted to the camera. The image data written to the memory card are expanded, or decoded, by the compander, once written to the frame memory, and then transferred to a playback circuit to display a still picture on a video monitor.

The image signal processing device built in the above-described type of electronic still camera has some problems left unsolved since the number of pixels is increasing in order to achieve image quality comparable with that of silver halide sensitive type of photography. For example, assume an image signal processing device included in an electronic still camera which uses a solid state imaging device having 1,300,000 pixels and implemented by a CCD (Charge Coupled Device) image sensor. A problem with this kind of image signal processing device is that the number of shots which can be stored in a memory card is reduced due to the huge amount of image data. On the other hand, when the compression ratio of an image is increased in order to increase the number of shots to be written to a memory card or to display an NTSC (National Television System Committee) standard video signal on a monitor, noticeable distortions occur when the compressed image is reproduced. Furthermore, high-speed image processing and data transfer are not achievable with this kind of device unless the device is provided with a master clock w h o se frequency is as high as 50 MHz to 75 MHz. In addition, such a high clock frequency is disadvantageous in that power consumption is aggravated and results in the need for a bulky battery which would degrade the portability of the camera. Further, the increase in power consumption increases the amount of heat generation and, therefore, the size of a heat radiation package built in the camera.

SUMMARY OF THE INVENTION

It is, therefore, an object of the present invention to provide an image signal processing device capable of compressing an image signal, which is generated by a high pixel density imaging device, in a high ratio to thereby increase the number of shots to be stored in a memory card.

It is another object of the present invention to provide an image signal processing device capable of reducing distortions attributable to the increase in the compression ratio of the image signal.

It is still another object of the present invention to provide an image signal processing device which consumes a minimum of power and, therefore, has a small size and light weight.

In accordance with the present invention, an image processing device, for recording in a memory card or similar data recording medium an image signal representative of an object which is picked up by an imaging device, comprises: a frame memory for storing the image signal representative of an object, a compander for compressing the image signal stored in the frame memory by compression and outputting the compressed image signal to the data recording medium, a reproducing circuit for reproducing an image represented by the image signal stored in the frame memory, and a memory controller for controlling the transfer of the image signal to thereby control the storage of the image signal in the frame memory. The storage controller comprises an address generator for generating, when the image signal is to be written to or read from the frame memory, an address signal designating the address of the frame memory, and a read/write controller for generating a control signal which selectively controls writing or reading of the image signal in or out of the frame memory. The address generator thins, when the image signal is to be written or read from the frame memory, pixels constituting the image signal by the address signal. The storage controller selectively controls, based on the address signal and control signal, writing or reading of the image signal in or out of the frame memory.

BRIEF DESCRIPTION OF THE DRAWINGS

The objects and features of the present invention will become more apparent from the consideration of the following detailed description taken in conjunction with the accompanying drawings in which:

FIG. 3(A) and (B) shows a specific data thinning or reducing procedure representative of an alternative embodiment of the present invention;

DESCRIPTION OF THE PREFERRED EMBODIMENTS

Figure 6:
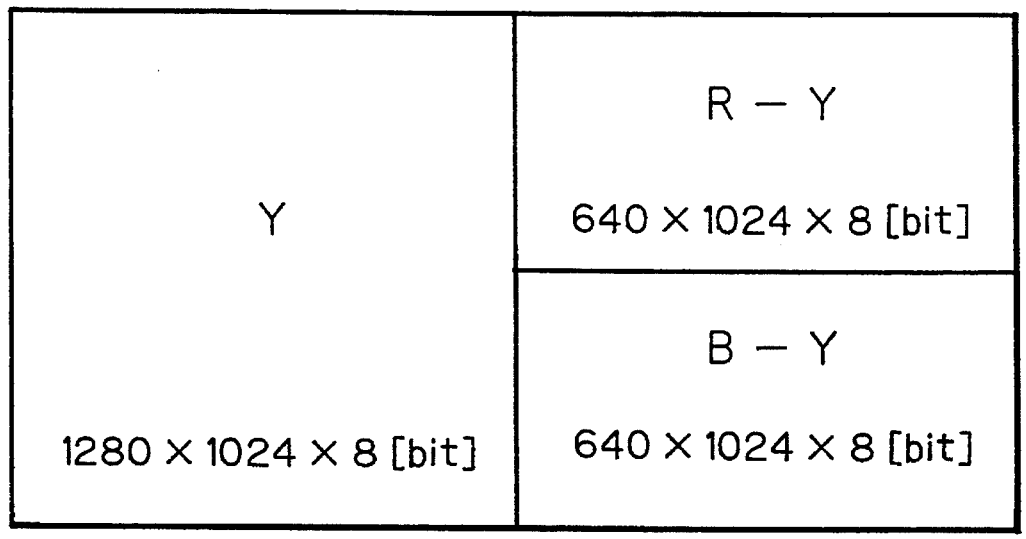
FIG. 6 is indicative of a specific format in which an image signal is stored in a frame memory included in the conventional image signal processing device.
Figure 5:
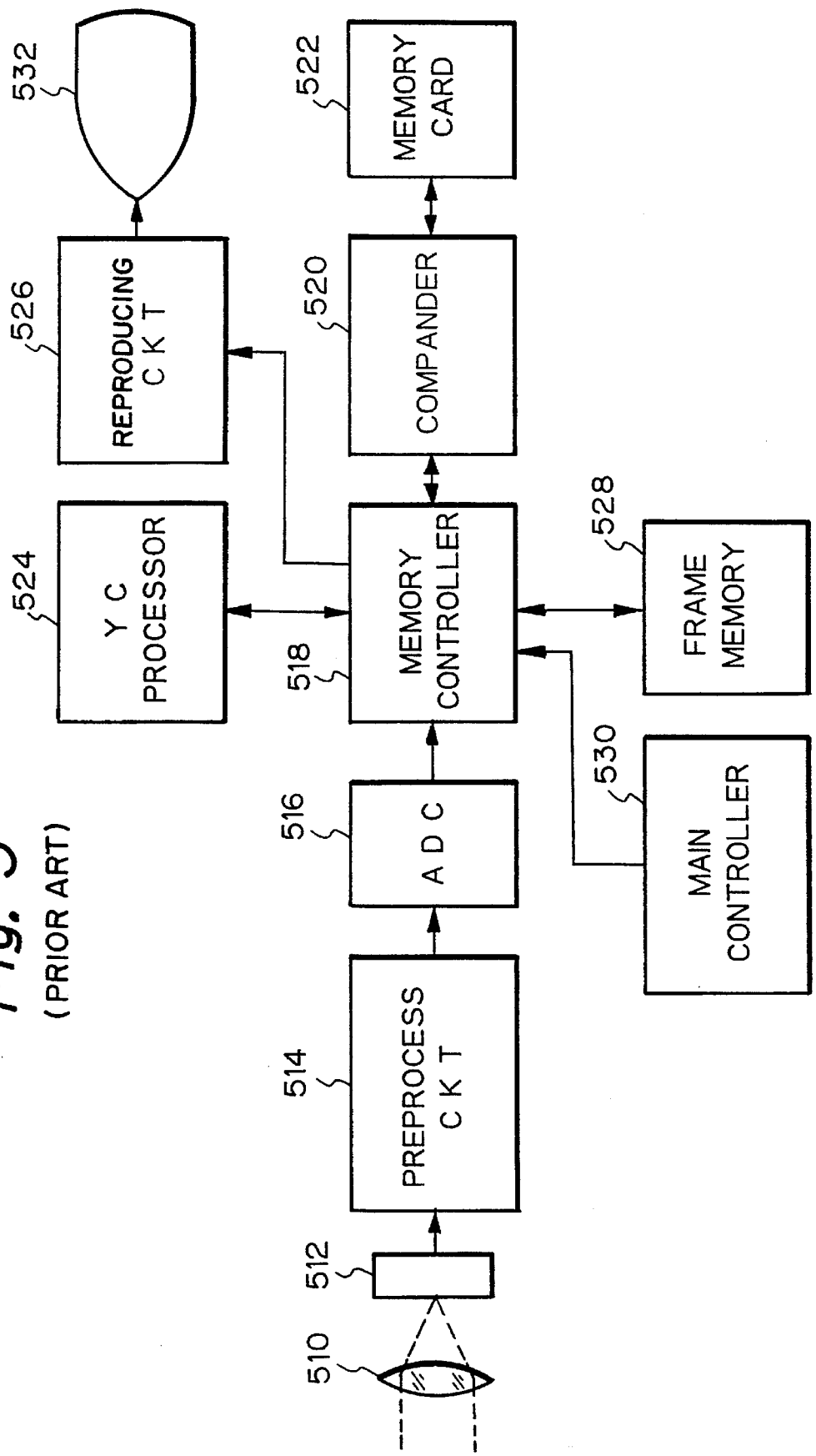
FIG. 5 is a schematic block diagram showing a conventional image signal processing device.

To better understand the present invention, a brief reference will be made to a conventional electronic still camera, shown in FIG. 5. As shown, the camera has a lens 510 and an imaging device 512. A scene picked up by the camera is incident to the imaging device via the lens 510 as an optical image. The imaging device 512 transforms the optical image to a corresponding electric image signal. A preprocessing circuit 514 executes white balance adjustment, tone correction and other conventional signal processing with the image signal. An analog-to-digital converter (ADC) 516 digitizes the analog image signal to produce a corresponding digital image signal, i.e., image data. The image data from the ADC 516 are written to a frame memory 528 under the control of a memory controller 518. At the same time, a YC processor 524 transforms the image data to image data represented by a luminance signal Y and chrominance signals R-Y and B-Y. As shown in FIG. 6 schematically, the frame memory 528 has the storage area thereof divided into two areas and stores the luminance signal Y and the chrominance signals R-Y and B-Y in the respective areas.

The image data stored in the frame memory 528 are sequentially read out in a plurality of blocks and then sent to a compander 520 to be compressed, or coded, thereby. The compressed data are written to a memory card 522 which is removably mounted to the camera. When the image data stored in the memory card 522 are read out, it is expanded, or decoded, by the compander 520, once stored in the frame memory 528, and then transferred to a playback or reproducing circuit 526. As a result, a still picture represented by the image data is displayed on a video monitor 532. However, the conventional image signal processing device applicable to this kind of camera has various problems to be solved, as discussed earlier.

Figure 1:
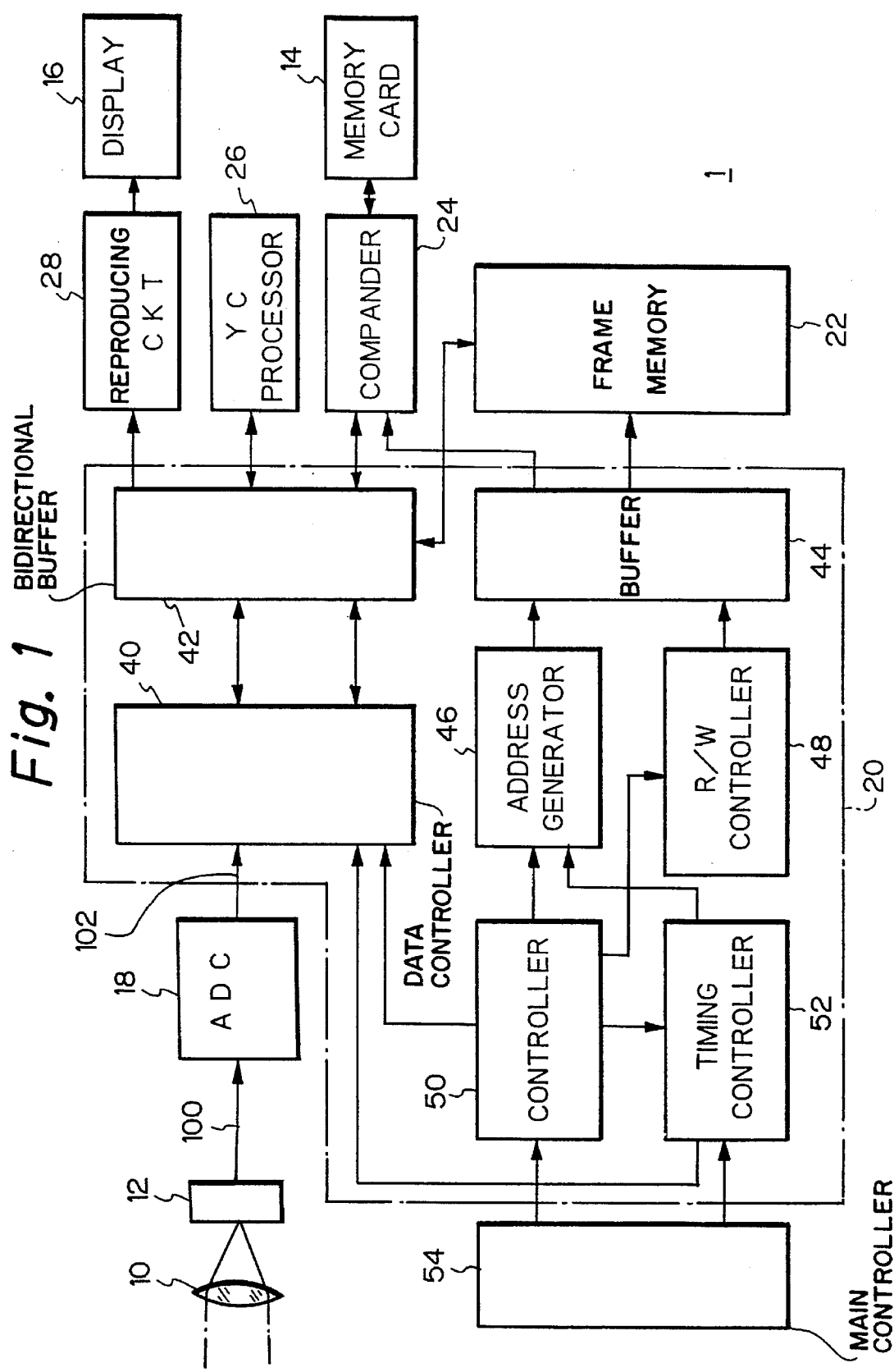
FIG. 1 is a block diagram schematically showing an electronic still camera to which an image signal processing device embodying the present invention is applied.

Referring to FIG. 1, an electronic still camera is shown to which an image signal processing device embodying the present invention is applied. As shown, the camera, generally designated by the reference numeral 1, has a lens 10 and an imaging device 12 to which an optical image representative of a scene is incident via the lens 10. The imaging device 12 generates an electric image signal corresponding to the incident optical image. The camera 1 is capable of compressing image data representative of the image signal and writing them in a memory card 14 which is removably mounted thereto. Also, the camera 1 is capable of reproducing the image represented by the image data and displaying it on a display 16. In addition, the camera 1 is capable of reading the image data out of the memory card 14, decoding them by expansion, and then displaying the resulting still image, or picture, on the display 16. The illustrative embodiment is effectively practicable not only with the memory card 14 but also with a magnetic disk, optical disk or similar filing device.

The imaging device 12 generates an electric signal, or image signal, representative of an optical image incident thereto via the lens 10. The imaging device 12 may advantageously be implemented by a solid state imaging device having about 1,300,000 pixels and provided with a color filter in the form of R (Red), G (Green) and B (Blue) segments. If desired, such an imaging device may be replaced with a three-board type imaging device. The electric signal from the output 100 of the imaging device 12 is applied to an ADC 18. In response, the ADC 18 transforms the analog image signal to a corresponding digital image signal or image data. The output 102 of the ADC is connected to a memory controller 20.

The memory controller 20 controls the writing and reading of image data out of a frame memory 22. Specifically, the memory controller 20 includes a data controller 40 which receives the image data from the ADC 18 and transfers them to a bidirectional buffer 42. The bidirectional buffer 42 interchanges image data with the frame memory 22, a compander 24, a YC processor 26, and a playback or reproducing circuit 28. An address generator 46 and a R (Read)/W (Write) controller 48 are connected to a buffer 44 and generate an address signal and an R/W enable signal, respectively. The memory controller 20 sends or receives image data to or from the frame memory 22 on the basis of the address signal and R/W enable signal. The data controller 40, address controller 46 and R/W controller 48 each operates in response to a control signal from a controller 50 and a timing signal from a timing controller 52. The controller 50 and timing controller 52 are, in turn, controlled by a main controller 54.

When image data are applied to the input 102 of the data controller 40, the controller 40 writes all the pixels of the image data in the frame memory 22 via the bidirectional buffer 42. When image data are read out of the frame memory 22, the data controller 40 delivers them to the YC processor 26 via the bidirectional buffer 42 and again writes the image data processed by the YC processor 26 to the frame memory 22. The YC processor 26 transforms the image signal of a field signal input thereto via the ADC 18 and memory controller 20 to an image signal consisting of a luminance signal Y and chrominance signals R-Y and B-Y.

When image data representative of a still image, or picture, are read out of the frame memory 22 to appear on the display 16, the data controller 40 transfers the image data to the playback circuit 28. For example, the playback circuit 28 converts image data transferred from the bidirectional buffer 42 to an analog signal and then outputs it to the display 16 together with a horizontal and a vertical synchronizing signal.

Further, assume that image data stored in the memory card 14 are expanded, or decoded, by the compander 24 and written to the frame memory 22. The data controller 40 transfers this kind of image data from the frame memory 22 to the playback circuit 28. The compander 24 compresses the luminance signal Y and chrominance signals R-Y and B-Y being transferred block by block. Compression is implemented by, for example, a sequence of steps of bidirectional orthogonal transform, normalization, and Huffman coding. Also, the compander 24 expands compressed data when they are read out of the memory card 14.

The memory card 14 connected to the compander 24 stores compressed image signals output from the compander 24. The card 14 may be comprised of an EEPROM (Electrically Erasable Programmable Read Only Memory) capable of storing data without resorting to a battery. If desired, use may be made of an SRAM (Static Random Access Memory) or similar memory device. When image data stored in the card 14 by the camera 1 or similar host are read out of the card 14, they are expanded by the compander 24 and then written to the frame memory 22. As the image data are read out of the frame memory 22, they are sent to the display 16 to display a still picture which they represent.

Figures 2, 3:
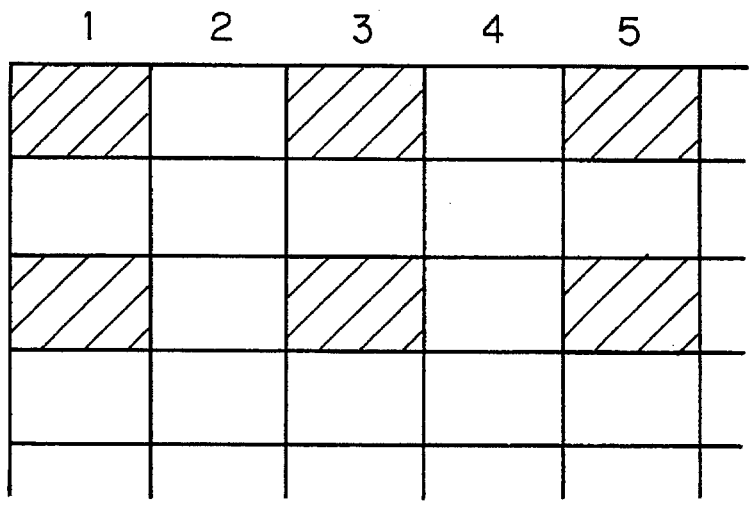
FIG. 2 demonstrates a procedure for thinning by half the amount of image data particular to the embodiment.

The operation of the embodiment will be described more specifically in relation to the flow of an image signal. An image signal output from the imaging device 12 is digitized by the ADC 18. All the pixels of the resulting digital image data are once written to the frame memory 22 via the memory controller 20. The image data are read out of the frame memory 22 and then applied to the YC processor 26 via the memory controller 20. The resulting luminance signal Y and chrominance signals R-Y and B-Y from the YC processor 26 are again written to the frame memory 22 via the memory controller 20. At this instant, the address generator 46, included in the memory controller 20, sequentially increments the write address in such a manner that only data corresponding to particular pixels, which are indicated by hatching in FIG. 2, are written to the frame memory 22. Subsequently, the data stored in the frame memory 22 are compressed by the compander 24. The image data of the compressed luminance signal Y and chrominance signals R-Y and R-B are recorded in the memory card 14. While the embodiment thins, or reduces, the image data from the YC processor 26 evenly in the event of writing them in the frame memory 22, they may be thinned when they are read out of the frame memory 22.

A reference will be made to FIG. 3 for describing an alternative embodiment of the present invention. This embodiment relates to how to generate addresses by the address generator 46 to thin image data in a desired thinning ratio. Specifically, when image data from the ADC 18 are to be written to the frame memory 22 or when image data are to be read out of the frame memory 22, the address generator 46 generates addresses designating storage locations in the frame memory 22 for thinning the pixels of an image represented by the image data to obtain a thinned frame of image. Two specific procedures are available for the address generator 46 to generate such addresses, as follows, While both of the two procedures may be implemented by the hardware architecture shown in FIG. 1, the address generator 46 is so constructed as to have the following capabilities.

(1) Simple Thinning

Assume that, in a pixel arrangement representative of a frame image, m pixels in the thinning (horizontal or vertical) direction should thinned, (i.e. subsampled) to produce n pixels where n is a natural number smaller than the natural number, m. Then, the address generator 46 performs the following procedure. FIG. 3 part (A) shows pixels $X_1$–$X_m$ before being thinned, or subsampled where m represents to a pixel position such as No. shows pixels $Y_1$–$Y_n$ after being thinned. Let the position of a thinned pixel be represented by a natural number i ($1 \leq i \leq n$). Assume that pixel in question in a thinned frame of an image has a pixel value or date $Y_i$, and that a pixel before being thinned which is closest to the center of the former pixel $Y_i$, in the thinning direction is in the position j ($1 \leq j \leq m$). Then, the address generator 46 generates an address so as to use the pixel data $X_j$ at the above-mentioned position "j" for data $Y_i$ of the thinned frame of image, namely:

$$Y_i = X_j \qquad \text{Eq. (1)}$$

For example, when the number of pixels in the horizontal or vertical direction is halved, a thinned image will be reproduced in exactly the same manner as in the previous embodiment.

(2) Difference-Based Proportional Thinning

Figure 4:
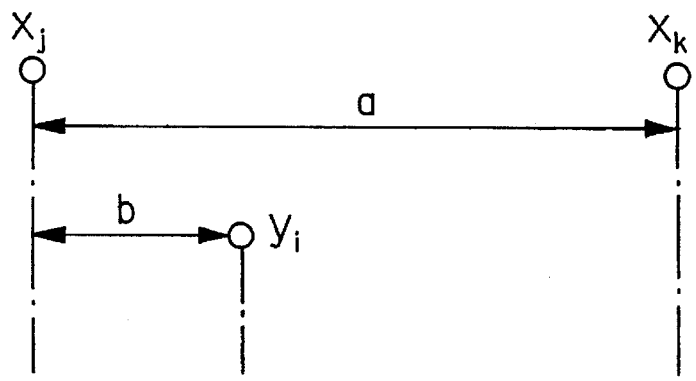
FIG. 4 shows a specific data thinning procedure representative of another alternative embodiment of the present invention.

The distances in the thinning direction from a pixel in question to pixels before being thinned are used to determine the resultant data of the pixel in question, as will be described with reference to FIG. 4. As shown in the figure, assume that a pixel $y_i$ in question has a pixel position "i" in the thinned frame of image, and two pixels $x_j$ and $x_k$ ("j"<"k") before thinning, respectively, precede and follow the pixel $y_i$ in the thinning direction. Further, assume that the distance between the pixel $x_j$ and $x_k$ is "a" in the thinning direction, that the distance between the pixels $x_j$ and $y_i$ is "b", and that the data of the pixels $x_j$, $x_k$ and $y_i$ are $X_j$, $X_k$ and $Y_i$, respectively. Then, pixel data $Y_i$ in question is determined as follows:

$$Y_i = ((a-b)/a)X_j + (b/a)X_k \qquad \text{Eq. (2)}$$

In the case, the pixel data thus obtained based on the Eq. (2) is sent to the frame memory 22 via the buffer 44 to be written to the frame memory 22.

With the thinning procedure (1) described above, it is possible to prevent the frequency band of pixel signals from being degraded. On the other hand, the procedure (2) is capable of reducing folding noise (aliasing). One of the two procedures (1) and (2) may be selected to implement a subsampled picture matching the user's taste. Further, the thinning operation may be selectively effected in order to store thinned image data and non-thinned or usual image data in the memory card 14, as desired. Such two kinds of image data may also be sent to the display 16 or even to a video printer, not shown.

As stated above, in the illustrative embodiments, 1,300,000 pixels of image data are generated by the imaging device 12 or read out of the memory card or similar medium 14, written to the frame memory 22, and then read out of the memory 22 while being thinned. As a result, an image, or picture, represented by such thinned image data appears on the display 16. In this case, the thinned image data can be processed at a speed customary with a conventional pixel density of 400,000 pixels. This not only realizes an image signal processing device with a simple configuration, but also prevents the power consumption of the device from increasing. This kind of image processing device is advantageously applicable to an electronic still camera and other electronic apparatuses of the kind needing high portability. In addition, when image data generated by the imaging device 12 are thinned and then written to the memory card 14, a greater number of shots can be stored in the card 14.

In summary, it will be seen that the present invention provides an image signal processing device which causes an address generator to generate a particular address signal, thins an image signal on the basis of the address signal, causes a compander to compress the thinned image signal, and then records the compressed image signal in a recording medium. The compressed image signal may be sent to a display in order to display a picture which it represents. The device, therefore, allows a great number of image signals, representative of shots derived from a high pixel density imaging device, to be recorded in the recording medium. Moreover, the device reduces image processing speed and, therefore, power consumption.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, compressed image data may be written to the memory card 14 at a low processing speed without being thinned, read out of the card 14, and then thinned before they are sent to the display 16.

What is claimed is:

1. An image processing device for recording in a data recording medium an image signal representative of an object which is picked up by imaging means, said device comprising:

storing means for storing the image signal representative of an object;

coding means for compressing the image signal stored in said storing means by compression and outputting the compressed image signal to the data recording medium;

reproducing means for reproducing an image represented by the image signal stored in said storing means on a display; and storage control means for controlling transfer of the image signal to thereby control storage of said image signal in said storing means;

said storage control means comprising:

address generating means for generating, when the image signal is to be written to or read from said storing means, an address signal designating an address of said storing means;

read/write control means for generating a control signal which selectively controls writing or reading of the image signal to/from said storing means; respectively said address generating means generating, when the image signal is to be written to or read from said storing means, an address signal to be used so that pixels constituting said image signal are thinned;

said storage control means selectively controlling, based on said address signal and said control signal, said writing or reading of the image signal to/from said storing means, respectively.

2. The device in accordance with claim 1, wherein said address generating means generates the address signal which selectively thins, depending on a destination of the image signal said storage control means, the pixels constituting said image signal or sequentially designates addresses of said pixels by said address signal; and wherein said storage control means determines whether or not the pixels constituting the image signal should be thinned.

3. The device in accordance with claim 1, wherein said address signal generated by said address generating means selectively comprises a first address signal for thinning the pixels evenly or a second address signal for thinning said pixels by weighting said pixels.

4. The device in accordance with claim 1, wherein said address signal generated by said address generating means selects, in a relation between the pixels of the image signal as a frame image, an address which is closest to a pixel not being thinned.

5. The device in accordance with claim 1, wherein said address generating means generates, in a relation between the pixels of the image signal as a frame image, addresses of two pixels $x_j$ and $x_k$, which are not compressed and which precede and follow, respectively, a pixel $y_i$ in a frame of an image being thinned for thereby separating pixel data $X_j$, and $X_k$ of said pixels $x_j$ and $x_k$, the pixel data $Y_i$ of the pixel $y_i$ being determined by an expression:

$$Y_i=((a-b)/a)X_j+(b/a)X_k.$$

where a is a distance between said pixels $X_j$ and $X_k$ and b is a distance between said pixels $x_j$ and $y_i$.

6. The device in accordance with claim 1, further comprising decoding means for expanding the image signal stored in the data recording medium, said storage control means causing the expanded image signal to be written to said storing means.

7. The device in accordance with claim 6, wherein said coding means and said decoding means comprise a single compander.

8. The device in accordance with claim 1, wherein the imaging means comprises an imaging device built in an electronic still camera.

9. The device in accordance with claim 1, further comprising reproducing means interconnected to said output means for reproducing an image represented by the image signal developed from said output means on a display unit.

10. An image processing device for recording in a data recording medium an image signal representative of an object which is picked up by an imaging device, said device comprising:

a memory circuit for storing the image signal representative of an object;

a coder circuit for compressing the image signal stored in said memory circuit by compression and outputting the compressed image signal to the data recording medium;

an output circuit for outputting the image signal stored in said memory circuit to a display; and a storage controller for controlling transfer of the image signal to thereby control storage of the image signal in said memory circuit;

said storage controller comprising:

an address generator circuit for generating, when the image signal is to be written to or read from said memory circuit, an address signal designating an address of said memory circuit;

a read/write control circuit for generating a control signal which selectively controls writing or reading of the image signal to or from, respectively, said memory circuit;

said address generator circuit generating, when the image signal is to be written to or read from said memory circuit, the address signal to be used;

said storage controller selectively controlling, based on the address signal and the control signal, writing or reading of the image signal to/or from said memory circuit, respectively.

11. The device in accordance with claim 10, further comprising a decoder circuit for expanding the image signal stored in the data recording medium, said storage controller causing the expanded image signal to be written to said memory circuit.

12. The device in accordance with claim 11, wherein said coder circuit and said decoder circuit comprise a single compander.

13. The device in accordance with claim 10, wherein the imaging device is built in an electronic still camera.

14. The device in accordance with claim 10, further comprising a reproducing circuit interconnected to said output circuit for reproducing an image represented by the image signal from said output circuit on a display unit.

* * * * *